United States Patent [19]

Neal

[11] Patent Number: 5,031,550
[45] Date of Patent: Jul. 16, 1991

[54] TREE SEEDLING PLANTING IMPLEMENT

[75] Inventor: Archie E. Neal, Garfield, Wash.

[73] Assignees: J. E. Love Company, Garfield, Wash.; Agro Forest Technik North America, Inc., Prince George, Canada; a part interest

[21] Appl. No.: 416,678

[22] Filed: Oct. 4, 1989

[51] Int. Cl.⁵ .................. A01C 16/00; A01B 63/161
[52] U.S. Cl. .................. 111/104; 111/115; 111/134; 172/4
[58] Field of Search .............. 111/104, 105, 109–113, 111/115–117, 135, 134, 137; 172/4

[56] References Cited

U.S. PATENT DOCUMENTS

| | | | |
|---|---|---|---|
| 2,567,107 | 9/1951 | Gobeil | 172/4 |
| 2,621,575 | 12/1952 | Berg | 172/4 |
| 2,669,920 | 2/1954 | DaValle | 111/109 |
| 2,719,498 | 10/1955 | Goolsby | 111/110 |
| 3,059,437 | 10/1962 | Jennings et al. | |
| 3,132,610 | 5/1964 | Hoffman | |
| 3,176,635 | 4/1965 | Mabon | |
| 3,294,046 | 12/1966 | Boots | |
| 3,605,908 | 9/1971 | McDonald et al. | |
| 3,643,611 | 2/1972 | Owens et al. | |
| 3,679,224 | 7/1972 | Hatches | 111/135 |
| 3,899,985 | 8/1975 | Rath | |
| 3,921,548 | 11/1975 | Alkemade | 111/117 |
| 3,931,774 | 1/1976 | Bradley | 111/109 |
| 3,972,294 | 8/1976 | Grundstrom et al. | |
| 3,998,171 | 12/1976 | Lofgren et al. | 111/117 |
| 3,998,276 | 12/1976 | MacMillan | 111/135 |
| 4,034,687 | 7/1977 | van der Lely | |
| 4,107,859 | 8/1978 | Keith | 172/4 |
| 4,111,135 | 9/1978 | Braun et al. | 111/114 |
| 4,112,857 | 9/1978 | Bradley | |
| 4,344,374 | 8/1982 | Gangluff et al. | |
| 4,364,316 | 12/1982 | Paladino | |
| 4,438,710 | 3/1984 | Paladino | |
| 4,566,543 | 1/1986 | Kotani | 172/4 |
| 4,788,920 | 12/1988 | Shaw | 111/115 |

FOREIGN PATENT DOCUMENTS

| | | | |
|---|---|---|---|
| 488692 | 5/1976 | Australia | |
| 62917 | 10/1982 | European Pat. Off. | 111/104 |
| 2432265 | 2/1980 | France | 111/105 |
| 2562378 | 10/1985 | France | 172/4 |
| 640061 | 5/1962 | Italy | 172/4 |
| 2144012 | 2/1985 | United Kingdom | 172/4 |

Primary Examiner—Danton D. DeMille
Attorney, Agent, or Firm—Wells, St. John & Roberts

[57] ABSTRACT

A seedling planter utilizes support wheels located on a main frame near the rear of the planter. The support wheels are pivotable relative to the frame, thereby allowing the force exerted by a set of intermediate packing wheels to be varied. The seedling planter was a novel planting assembly which incorporates two primary structural members; a first planting assembly piece or link which is connected to the frame, and a planting arm which is pivotally connected to the first piece. The first piece is movable to vary the height of the pivot axis about which the planting arm rotates. The planting assembly also includes a soil height level detection subsystem to automatically control downward extension of the first planting assembly piece. The planting arm is thus positioned at a desired predetermined height above the soil as it is rotated into the ground to provide consistent planting depth. A cam-operated seedling holder clamps the seedlings along the rear edge of the planting arm. Extension of the planting arm downwardly causes the seedling to be automatically grasped by the jaws. A lever arm actuator automatically opens the seedling holder when the planting arm is extended to thereby release the seedling into a short furrow formed in the soil by the extended planting arm. Also described are novel methods.

9 Claims, 9 Drawing Sheets

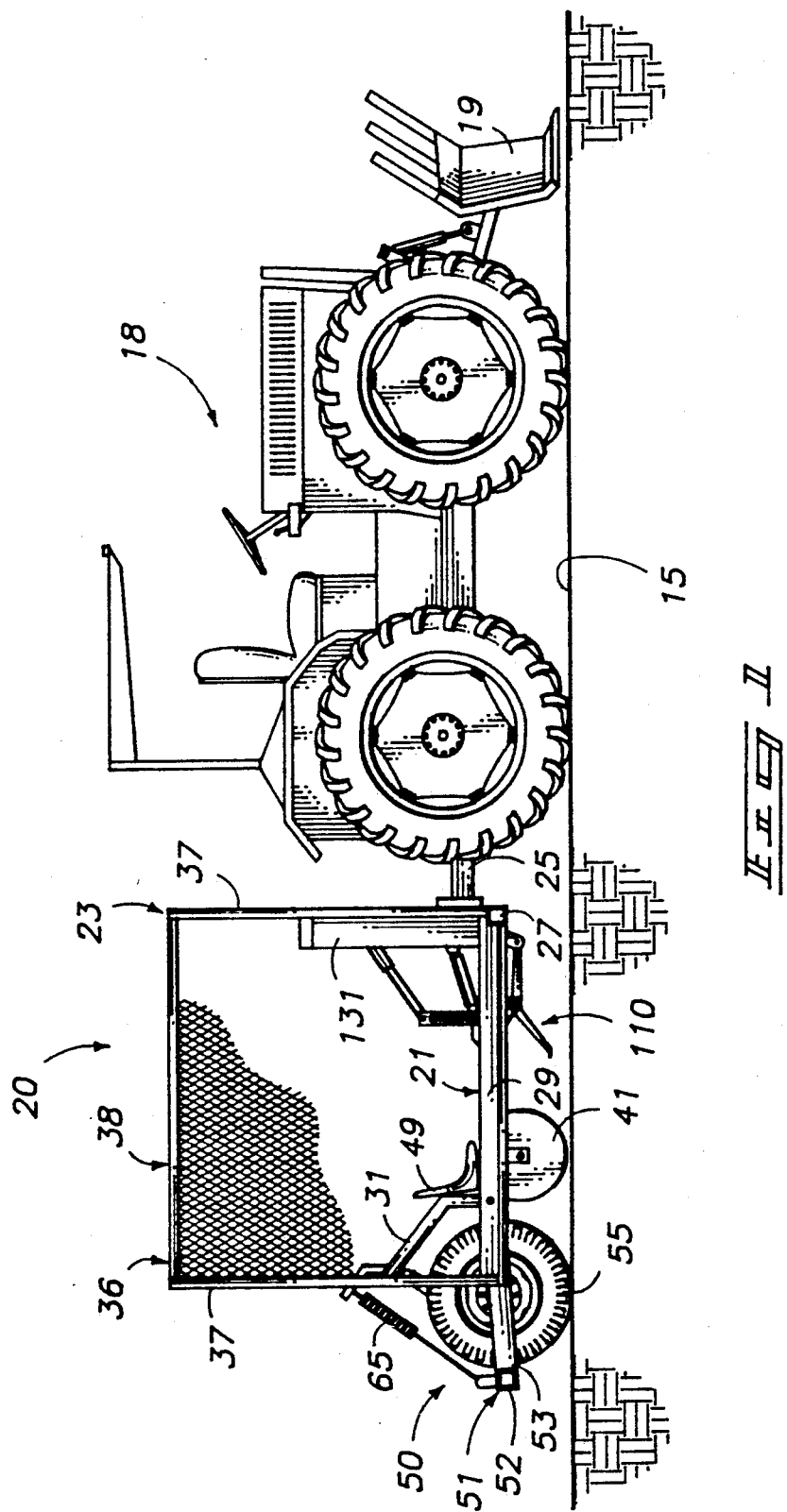

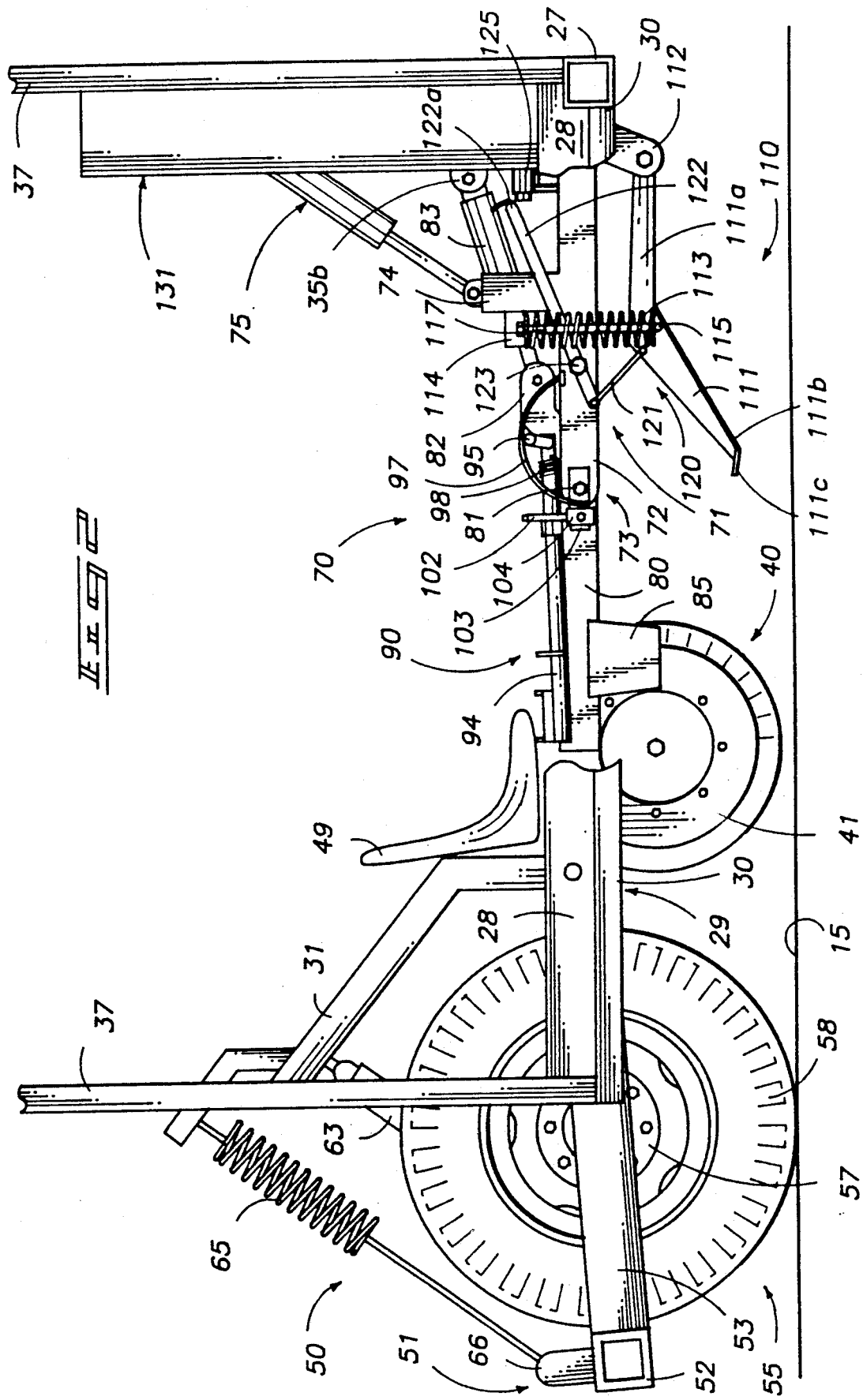

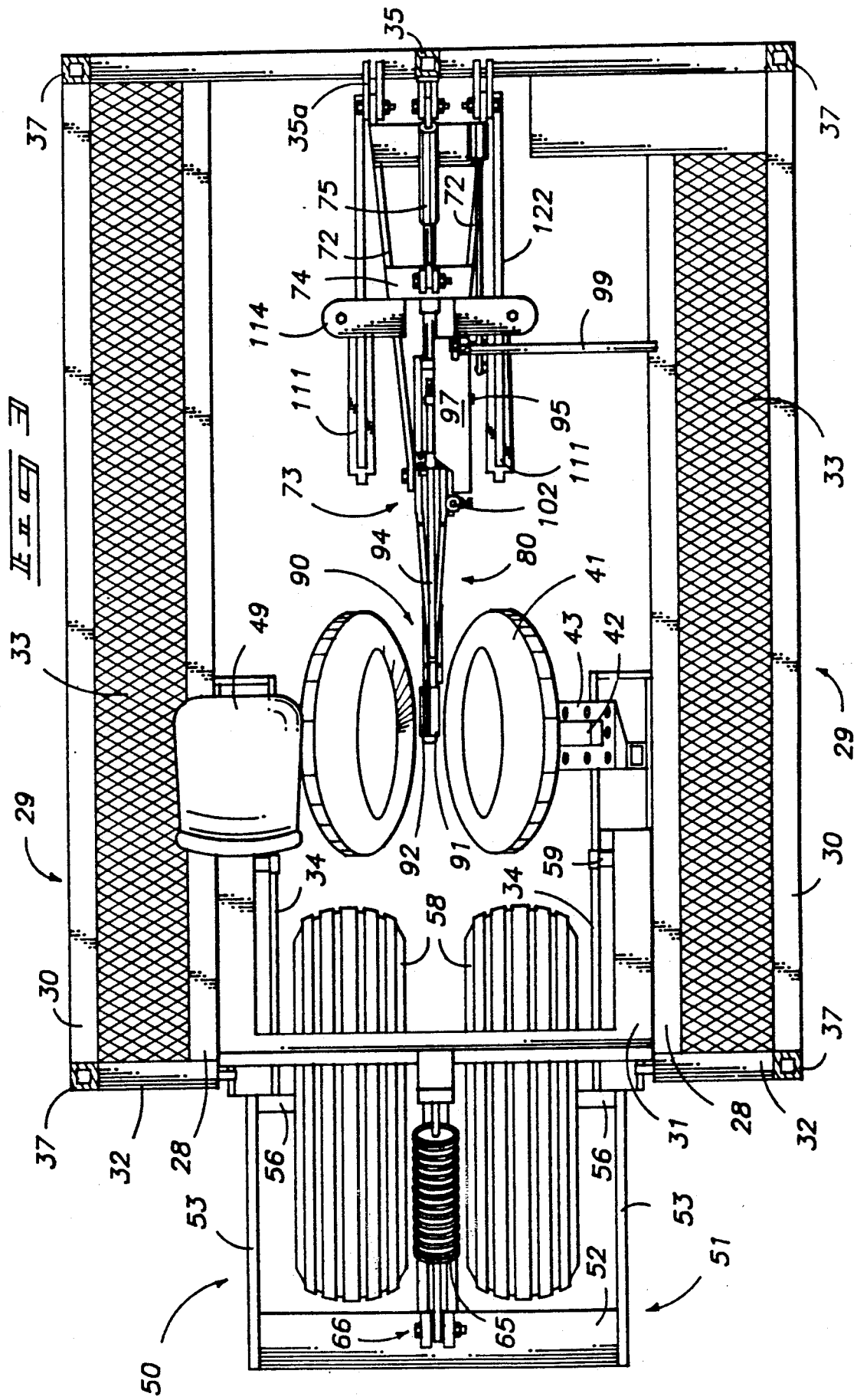

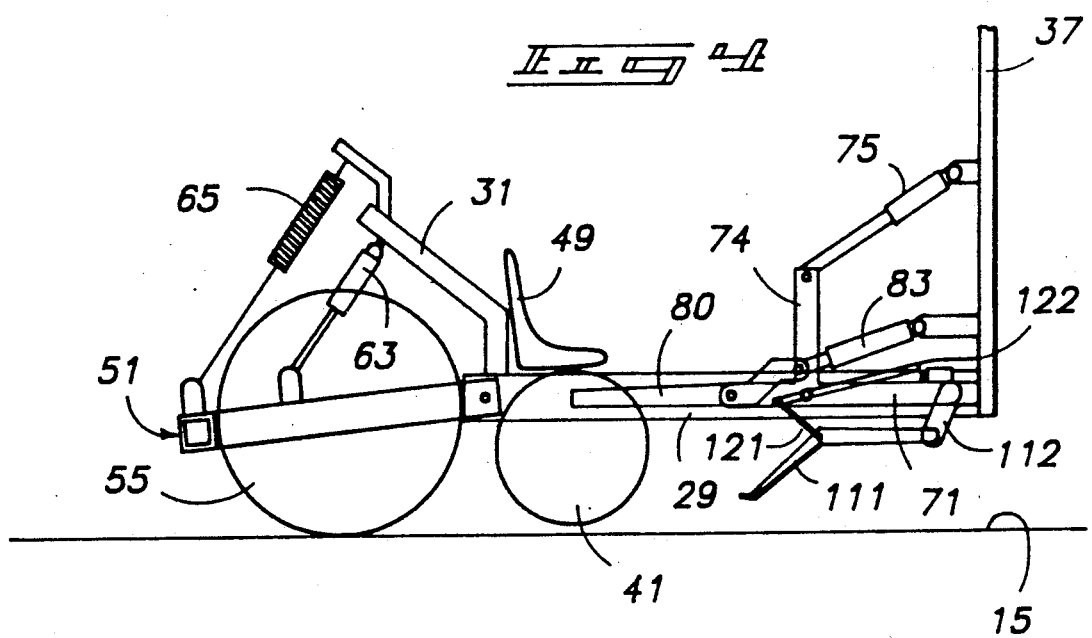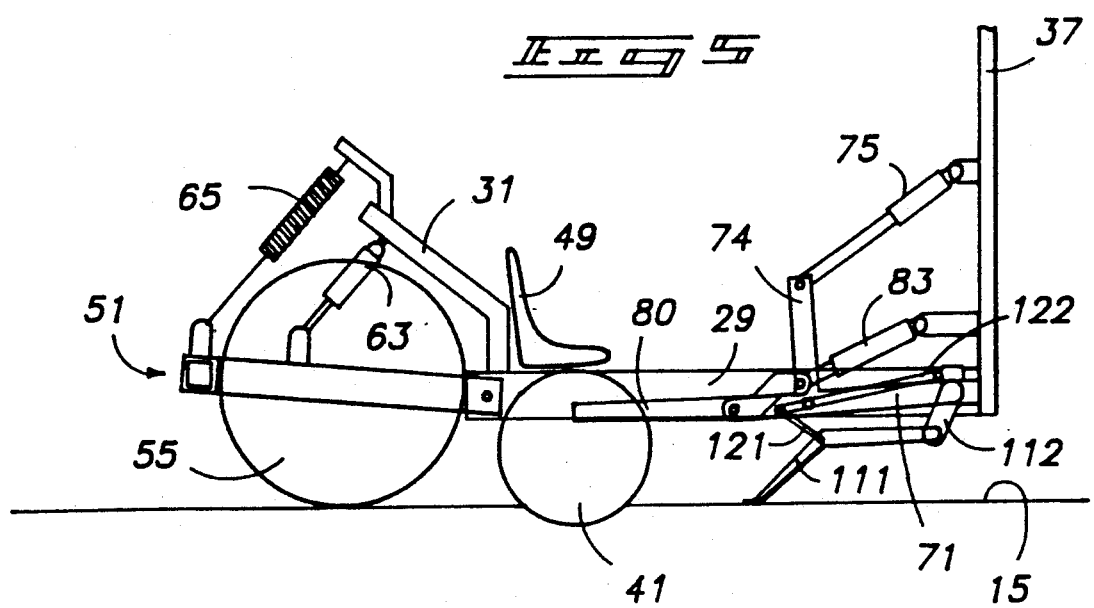

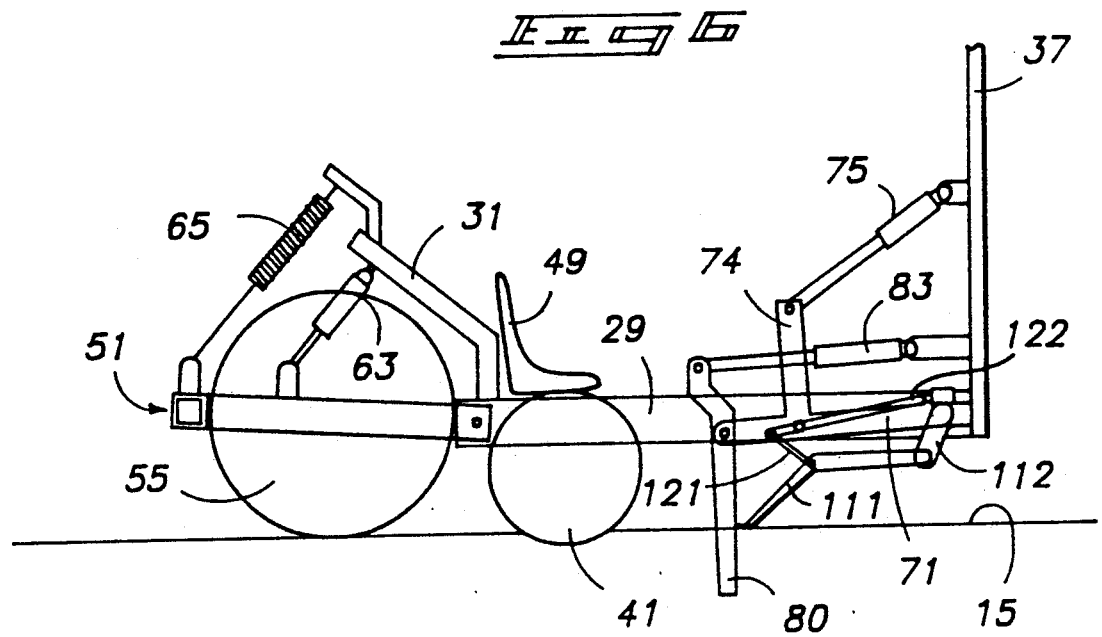
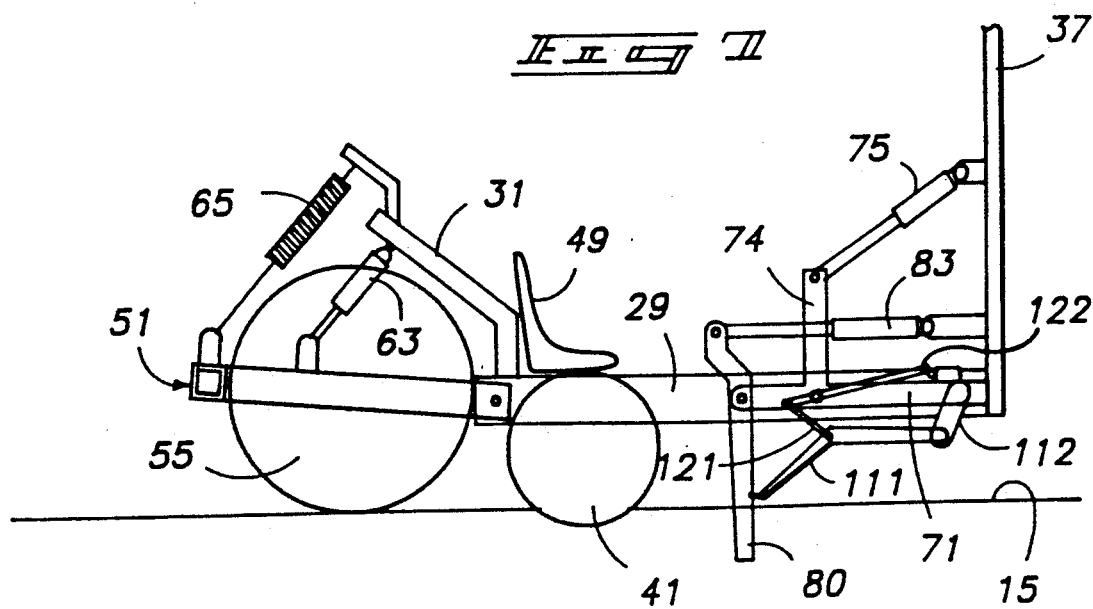

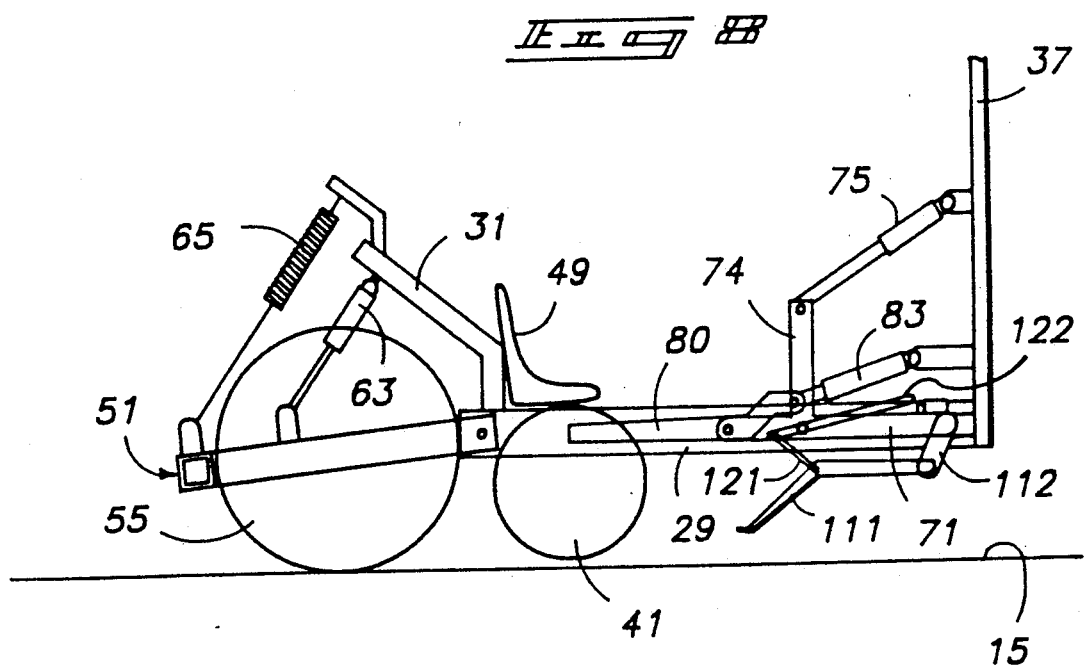

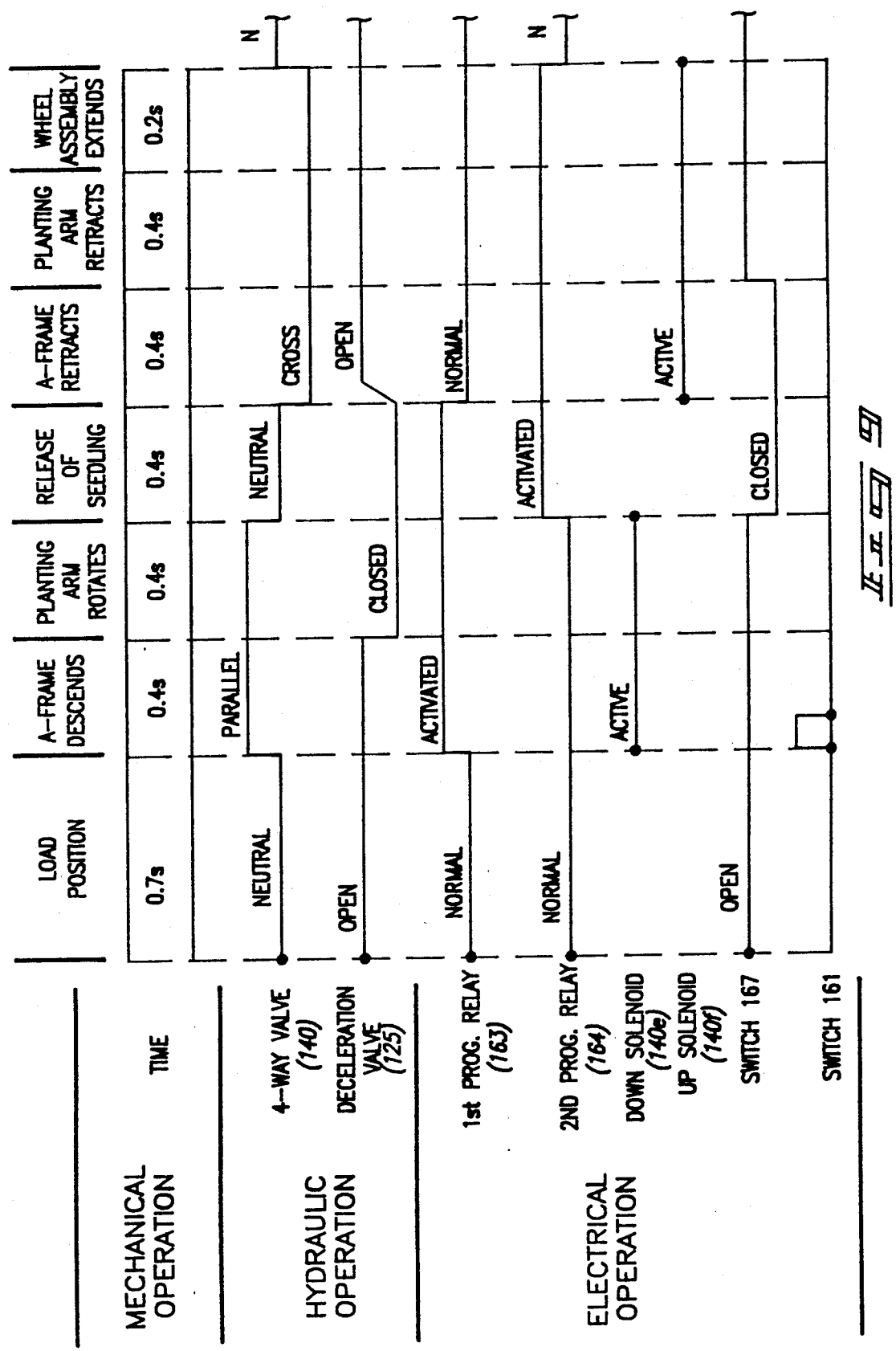

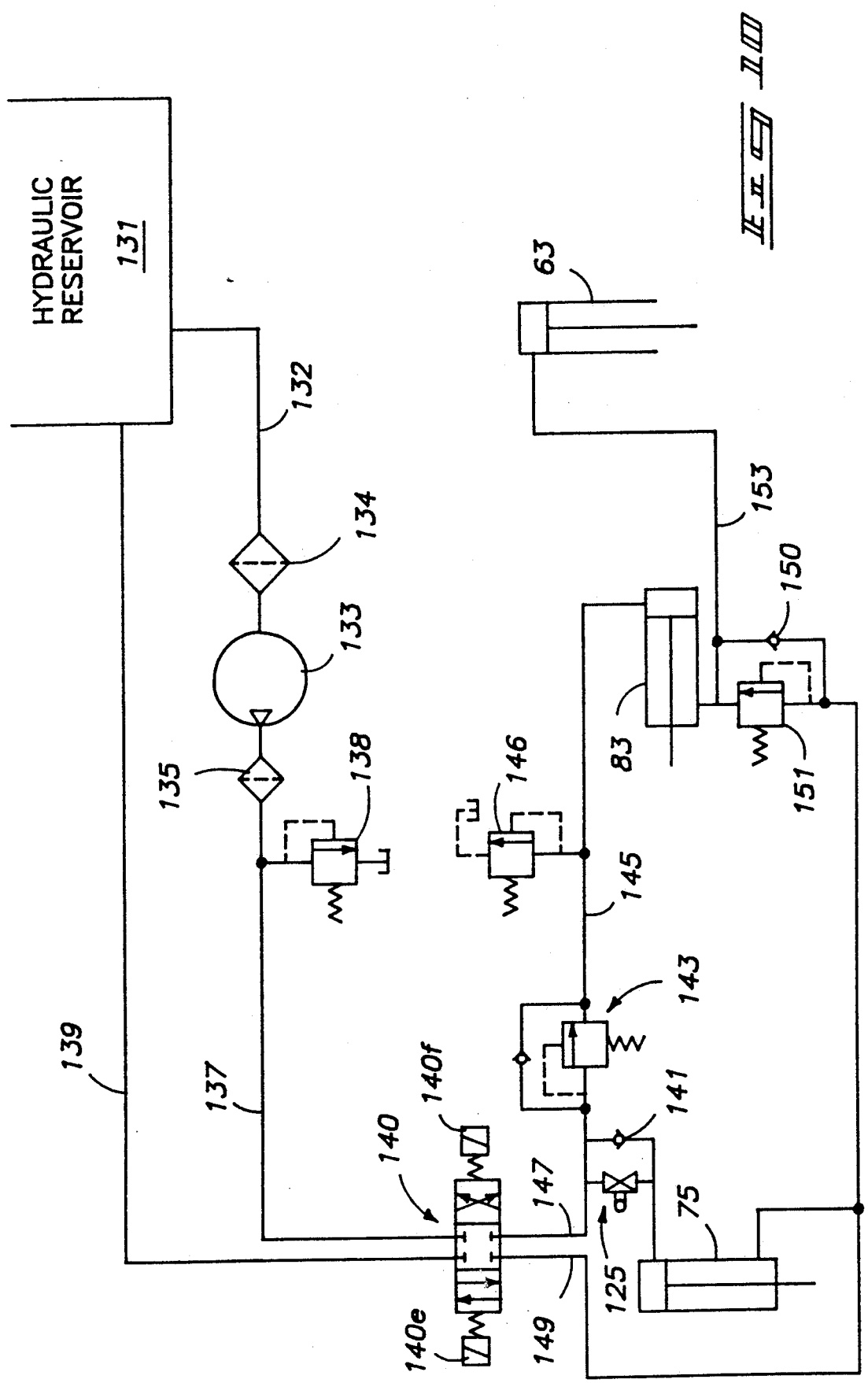

TREE SEEDLING PLANTING IMPLEMENT

TECHNICAL FIELD

The technical field of this invention is automated tree seedling planting equipment and methods.

BACKGROUND OF THE INVENTION

The widespread harvesting of lumber has increased the need for improved re-forestation practices. Of primary importance is planting the logged areas with new trees. It is common for re-forestation planting to be accomplished by manual labor, but such an approach is costly because of the difficulty of the work and the large amounts of area which must be covered. There have been numerous attempts to design a suitable tree seedling planter which is effective and efficient. To date all mechanized tree seedling planters have suffered from one or more limitation which deterred the acceptance of these implements by the lumber industry.

One problem which has been of particular difficulty is the need to place the seedlings at a specific depth in the soil. Seedlings placed too deep can become overlaid with soil or debris and not survive. If seedlings are not placed deep enough then root tissues can be left exposed and rendered ineffective at collecting moisture from the surrounding soil. This leads to drying of the seedlings and often to death. The problem of consistent seedling planting depth is made more difficult when planting in rough terrain. Relative movement between the tractor and seedling planter often lift or depress specific parts of the seedling planter thus changing the depth at which the seedlings are planted. This is particularly a problem when the planter is pitched with respect to the tractor about a transverse horizontal axis. Because of these difficulties the placement of seedlings by prior mechanized seedling planters has not been consistent, and a long felt need for better seedling depth consistency has plagued the lumber industry.

Another problem associated with seedling planting is inconsistency or inadequacy of packing the seedling into place. Seedlings have a better survival rate when the soil immediately about the root tissues is packed. This packing stabilizes the position of the seedling and improves the water uptake during the initial critical days after planting. The same problems of relative motion between the seedling planter and tractor also cause substantial variations in the degree to which soil is packed about the seedlings. Improved packing of soil about seedlings has also long been a desired goal in mechanized seedling planters.

Some prior art seedling planters utilized a set of one or more packing wheels which ran continuously behind the planting portion of the implement. Such an approach can form continuous depressions which initiate formation of gullies and increase erosion. The continuously contacting type of packing wheels also suffer significant wear and tear due to the constant working of ground which is often rocky and rough.

Some prior art seedling planters have also used coulters or other ground cutting disks to form a seedling furrow which sometimes ran continuously over the ground. The seedlings were intermittently placed along the furrow and packing accomplished after seedling placement. Such an approach to seedling planting requires that substantial amounts of soil be worked in order to place seedlings. However, the seedlings only require disruption of a relatively small amount of soil immediately about the seedling. The continuous furrow approach also wastes substantial amounts of energy and increases wear and tear on both the seedling planter and the pulling tractor.

Many prior art seedling planters were also manually operated with respect to many of the operating steps. The operator typically inserted the seedling into some type of planter element and then manually operated levers or other equipment to cause the machinery to proceed with the installation of the seedling into the ground. Accordingly, there is a need for an improved seedling planter which operates on a more automated basis with a minimum of required operation by a person.

In light of these and other considerations there remains a great need for a more efficient and effective automatic mechanized seedling planter. The current invention provides a novel seedling planter which is an improvement in the art of seedling planters.

BRIEF DESCRIPTION OF THE DRAWINGS

A preferred embodiment of the invention is illustrated in the accompanying drawings which are briefly described below.

FIG. 1 is a side elevational view showing a preferred seedling planter of this invention pulled by a suitable tractor.

FIG. 2 is an enlarged side elevational view of the seedling planter of FIG. 1. Portions have been broken away to better show the invention.

FIG. 3 is an enlarged top view of the seedling planter shown in FIG. 1 with the roof portion broken away.

FIGS. 4–8 are schematic side elevational views of the seedling planter of FIG. 1 showing the seedling planter in five different operational positions passed through in a normal operational cycle.

FIG. 9 is a timing diagram detailing the preferred operation of the seedling planter shown in FIG. 1.

FIG. 10 is a schematic diagram showing the preferred hydraulic system forming a part of the seedling planter shown in FIG. 1.

DETAILED DESCRIPTION OF THE PREFERRED EMBODIMENTS

Figure 11:
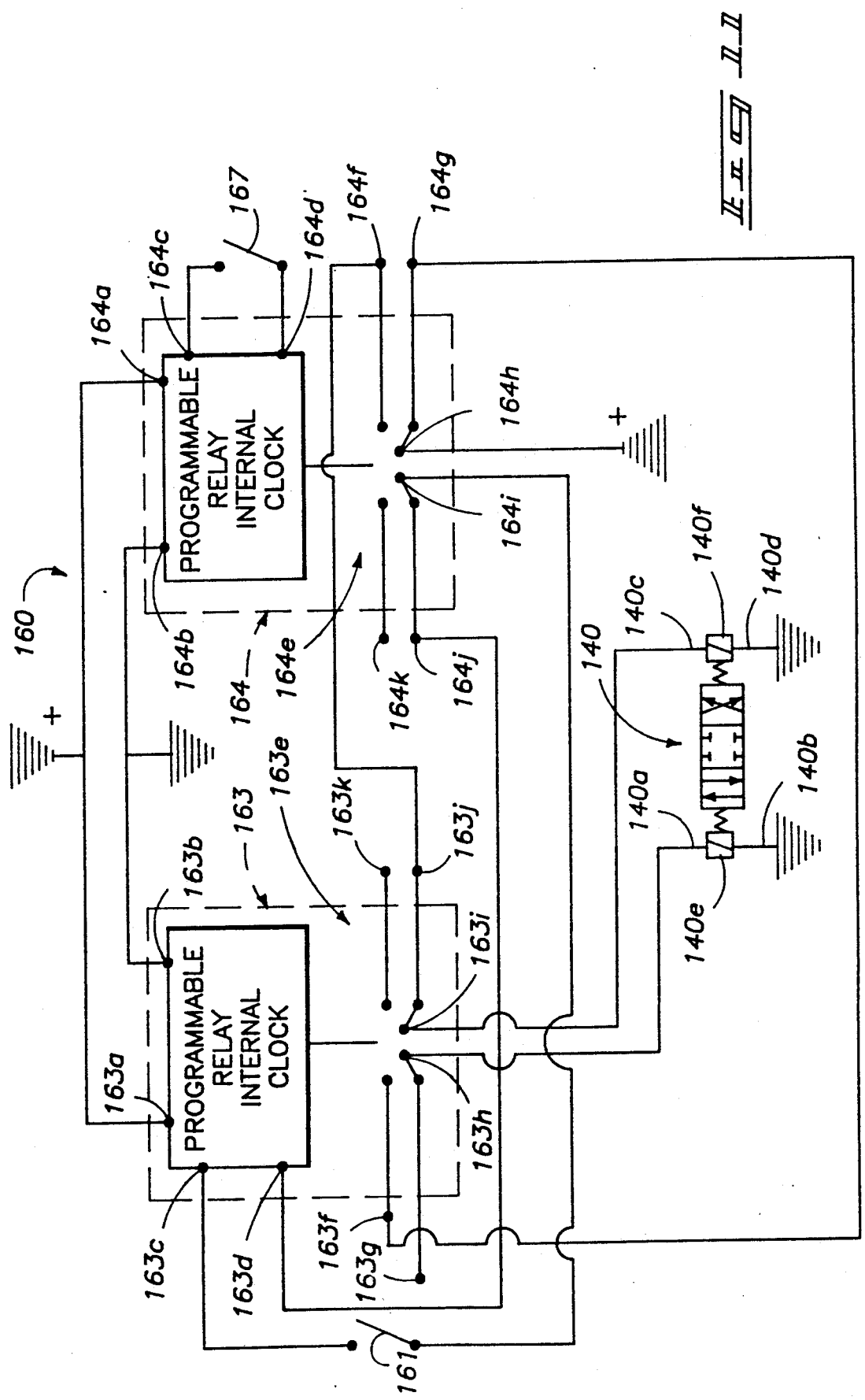
FIG. 11 is an electrical schematic diagram showing the preferred electrical control system forming a part of the seedling planter shown in FIG. 1.

The following disclosure of the invention is submitted in furtherance with the constitutional purpose of the Patent Laws "to promote the progress of science and useful arts" (Article 1, Section 8).

FIG. 1 shows a preferred tree seedling planter 20 connected behind a tractor 18 or other suitable pulling vehicle. The tractor is of conventional design used in lumber harvesting operations and is advantageously provided with a blade 19 at the front end for clearing brush and the like from the path along which seedlings are to be planted. The seedling planter 20 is connected to tractor 18 using a suitable hitch 25, such as a conventional vertical pin or ball hitch. Other types of hitches are alternatively useful with seedling planters made in accordance with this invention.

Seedling planter 20 is provided with a frame 21 which is the fundamental structural assembly of the implement. Frame 21 is connected to hitch 25. Frame 21 preferably includes a front transverse member 27. A pair of frame side subassemblies 29 extend rearwardly from front transverse member 27 to form a generally U-shaped structural framework in horizontal plan view. The rearward portions of the frame side subassemblies 29 are preferably stabilized relative to each other using a rear transverse frame member 31 which extends upwardly, rearwardly and transversely across between the two frame side subassemblies 29. The upward and rearward roughly C-shaped configuration of the rear transverse frame member 31 allows the support wheel assembly 50 to be connected thereto and keeps the transverse frame member free from the operation of the planting arm 80 which will be explained below. The side frame assemblies 29 are advantageously constructed using two longitudinal side frame members 28 and 30 which are each connected to the front transverse member 27, such as by welding or mechanical fasteners. The inside longitudinal side frame members 28 are the major longitudinal frame members. The rear ends of the outer side frame members 30 are advantageously joined to the inner side frame members 28 by rear side frame member struts 32 which are preferably welded to each. The upper surfaces of the side frame subassemblies 29 are advantageously provided with a reticulated material, such as expanded metal mesh, or other suitable decking layer 33 to provide good footing support for the seedling planter operator when mounting or otherwise working on or around the planter.

The seedling planter frame 21 also preferably includes a frame superstructure 36. The superstructure advantageously includes corner posts 37 which extend upwardly from the frame bed to support a roof structure 38. The front and both side panels of the superstructure are advantageously provided with a protective layer, such as expanded metal mesh, or other reticulated material allowing vision from the forwardly viewing operator's seat 49. The roof and rear panel is left open to allow access by the operator.

The rearward interior portions of the U-shaped frame 21 are also adapted to mount a support wheel carriage assembly 50. The support wheel carriage assembly has a support wheel carriage frame 51 which is preferably mounted to pivot relative to the frame 21 to allow the weight carried by the support wheels to be controllably varied as will be explained more fully hereinafter. This is advantageously provided using opposing side pivot journals 59. The journals 59 receive a pivot pin (not illustrated) which is supported between an interior side frame assembly support bar piece 34 and the inside longitudinal frame member 28. The support bar pieces 34 are formed in a rectangular loops and are preferably detachably mounted to the inside of the side frame members 28, such as by using bolts.

As shown, the support wheel carriage frame includes a rear transverse wheel carriage frame piece 52 which is connected to two wheel carriage side frame members 53. The wheel carriage side frame members are adapted to rotatably mount the support wheels 55, such as by using two stub axles 56 which are securely mounted along the inside of the wheel carriage frame in a cantilevered arrangement. The stub axles 56 rotatably mount two wheel hubs 57 which are adapted to secure the support wheels thereto in a conventional or other suitable fashion. The support wheels are preferably provided with pneumatic tires 58 to provide increased resiliency for traversing rough terrain and for good road travel ability when the seedling planter is drawn down the highway.

The support wheel carriage assembly 50 is actuated by a support wheel carriage actuator, which is preferably provided in the form of a fluid powered ram 63, advantageously a hydraulic ram. The ram 63 is advantageously mounted between a ram mounting extension provided on the C-shaped rear transverse member 31 of the frame, and the rear transverse wheel carriage frame piece 52. The ram 63 is used in an extension mode only, although a double acting cylinder might be alternatively used. The preferred embodiment uses a wheel carriage return spring 65 which is an extension spring which returns the wheels toward an upward, retracted position relative to the frame 21. The return spring is advantageously mounted adjacent to the ram 63, and can be provided with an adjustable mounting 66 to aid in assembly and allow adjustment for proper spring return force.

As indicated above, the seedling planter 20 is preferably provided with a suitable packing means, such as packing or press wheel assembly 40. The packing wheel assembly includes two packing wheels 41 which are connected to axle assemblies 42. The axle assemblies 42 are preferably mounted to the frame at inner side members 28 using a multi-aperture mounting plate 43 which receive fasteners holding the axal assemblies 42 in place thereon. The packing wheels are secured in position relative to the frame 21 so that variations in the vertical position of the support wheels 55 are effective at transferring weight of the seedling planter to and from the packing wheels during the seedling placement thereby increasing the packing force and packing effectiveness. The packing or press wheels 41 preferably include convex interior faces. The packing or press wheels 41 are arranged in a downwardly converging orientation to pack soil immediately adjacent the seedling as the seedling is placed into the soil and released. It should also be noted that the packing wheels are mounted rearward and adjacent to the seedling planting arm to provide packing immediately after the seedling has been placed into the ground.

FIG. 2 shows the seedling planter with portions of the superstructure and side frame assembly removed to more clearly illustrate the planting subassembly 70. FIGS. 4–8 further show the most relevant components of the planting subassembly in schematic form and in differing operational positions. Planting subassembly 70 is connected to the main frame 21 at or near a central frontward position, such as near vertical front central frame member 35 and between the side frame assemblies 29. The first planting assembly piece or link 71 is mounted to allow vertical movement relative to the frame, such as the pivotal mounting of the forward end of piece 71 to the frame 21. The exact configuration used to mount the first planting assembly piece is not critical. As shown, the first planting assembly link 71 is pivotally mounted to the front transverse member 27 using mounting tabs which are welded thereto. The first piece 71 is advantageously formed as a welded assembly in a generally A-shaped configuration when viewed in the horizontal plane, with the wide end being pivotally connected to the frame towards the front, and the narrow or apex end of the A-shape extending rearwardly. The A-shaped first planting assembly piece 71, or A-frame, is advantageously formed of two side bars 72 joined at intermediate points with the apex forming a slotted yoke 73 for pivotally mounting a second planting assembly piece or link hereinafter referred to as planting arm 80. Planting arm 80 is connected to the first planting assembly piece 71 using planting arm pivot pin 81.

The first planting assembly link 71 also preferably includes an actuator connection which is advantageously provided in the form of a transverse extension bar 74. The actuator extension 74 is an upwardly extending bar connected to both side bars 72 with a pivot connection for the actuator which is centrally located along an approximate longitudinal axis of both the A-shaped piece 71 and the longitudinal axis of the seedling planter 20. The actuator extension 74 provides a pivotal connection between the first planting assembly link 71 and a first planting assembly piece actuator 75. The actuator 75 is preferably a fluid powered extendible and contractible ram, such as a hydraulic ram assembly. The ram actuator 75 angles upwardly from the pivotal connection with the extension 74 and is pivotally mounted to the frame at frame central vertical member 35. The pivotal mount is preferably accomplished using two horizontal mounting extensions 35a (see FIG. 3). The first planting assembly piece actuator is used to move the rearward portions of the first planting assembly piece 71 downwardly and upwardly by extending or contracting the ram 75. FIG. 6 shows the first planting assembly piece 71 rotated counterclockwise to thereby move the planting arm pivot axis, defined by pivot pin 81, downwardly as compared to the position shown in FIG. 4. The ram 75 is controlled, preferably by a novel automatic control system described below, which positions the planting arm pivot axis at a desired elevation above the soil level 15 to provide improved consistency in the seedling planting depth versus prior art equipment.

FIG. 2 and FIGS. 4-8 show that the planting arm 80 is advantageously formed as an elongated bar or assembly of two bars adapted for pivotal connection at the planting arm pivot axis defined by pivot pin 81. Planting arm 80 is further provided with an upper offset end 82 which is advantageously formed as a connection yoke with a pivot pin spanning across it for receiving the rearward end of a planting arm actuator 83. Planting arm actuator 83 is preferably an extendible and contractible link in the form of a fluid powered ram, such as a hydraulic ram. The opposite end of the planting arm ram 83 is pivotally connected to the frame, such as by using a pair of horizontal mounting extensions 35b attached at opposing sides of the central vertical frame member 35. Contraction of the planting arm actuation ram 83 causes the planting arm to assume a longitudinal, approximately horizontal, loading position, as shown in FIGS. 2 and 4. Extension of the ram 83 causes the planting arm to rotate counterclockwise to obtain a downwardly extending, approximately vertical, planting position, as shown in FIG. 6.

Planting arm 80 mounts a seedling holding and dispensing mechanism 90 which is used to hold a seedling, reposition the seedling downwardly into the soil, and dispense the seedling into a short furrow cut in the soil by the planting arm. To aid in this furrow cutting function the planting arm is advantageously provided with a debris clearing attachment or blade 85 upon the forward or cutting edge of the planting arm. The debris blade 85 can be formed by two pieces of metal plate welded together and to the sides of the planting arm. The seedling holder 90 is mounted upon the rearward or trailing edge or surface of the planting arm 80. The seedling holder mechanism includes a pair of jaws 91 and 92 which are controlled between open and closed positions. In the open position the first jaw 91 and the second jaw 92 are spread for loading, to receive a seedling which is manually placed therein by the seedling planter operator. The first jaw 91 is mounted on the planting arm in a stationary position, whereas the second jaw 92 is mounted to the planting arm on the end of a seedling holder actuation rod 94. The seedling holder actuation rod 94 is movable to operate the jaws between the open and closed positions. The seedling holder actuation rod 94 is preferably pivotable about a longitudinal axis of that rod in response to force applied via a seedling holder actuation rod lever arm 95. The seedling holder actuation rod 94 can be constructed as a coaxial assembly of an outer casing which is secured to the rear edge of the planting arm, with a pivotable rod held therein in a journaled relationship. The lever arm 95 is attached to the journaled inner rod, and extends outwardly to engage against a cam 97 during portions of the operational cycle wherein the planting arm is retracted upwardly. The lever arm 95 engages the cam 97 to open the jaws. The lever arm 95 engages a lever arm actuator 102 when the planting arm is moved into the downward planting position of FIG. 6. The lever arm actuator 102 is mounted to the planting assembly first piece 71, preferably using an adjustable mounting piece 104. In between the extended and retracted extremes in position of the planting arm, the seedling holder actuation rod is returned to cause clamping action between jaws 91 and 92, using a biasing means such as seedling holder biasing spring 98. Spring 98 applies torque to the inner rod and returns the second jaw against the first jaw. This causes a seedling placed between the jaws to be held on a downward stroke and released when the planting arm is fully extended.

The cam 97 is preferably mounted to the frame 21 using a cam mounting arm 98 which is advantageously provided with an adjustable cam mount 99 (see FIG. 3). The lever arm 95 can advantageously be provided with a cam follower roller which is supported by a suitable bearing at the end of the lever arm. Initial action of the planting assembling causes the planting assembly first piece 71 to rotate downwardly thus causing the jaws of the seedling holder to close as the cam follower separates from the cam. Subsequent action of the planting arm causes the lever arm 95 to contact the lever arm actuator to thereby open the jaws when the planting arm is fully extended into the planting position shown in FIG. 6.

FIG. 6 also illustrates that the planting assembly forms a parallelogram linkage when the planting arm 80 is fully extended. The parallelogram linkage is formed by the first planting assembly link 71, second or planting arm link 80, planting arm actuation link 83, and frame 21. This parallelogram four bar linkage arrangement maintains the planting arm in a desired orientation, such as vertical, even though the angle of the first link 71 may vary relative to the frame because of variations in soil and terrain.

The seedling planter 20 is preferably provided with a soil level detection system 110 which detects the level of the soil or ground with respect to the planter. The level of the soil is in particular detected with respect to the pivot axis of planting arm 80. FIG. 2 shows a preferred form of soil level detection system which includes a pair of contact or sensing arms 111 which are arranged on opposite sides of the A-frame piece 71. Contact arms 111 are pivotally mounted to the frame 21 using contact arm mounting extensions 112. Alternatively, the contact arms can be pivotally mounted to the first piece 71 of the planting assembly. The contact arms 111 are preferably shaped in two sections with a rearwardly extending section 111a and a depending section 111b. A contact foot or plate 111c is also preferably included along the front edge running from near the junction of the two contact arm sections to the distal end of the contact arm. The contact arms are preferably biased downwardly relative to the first piece of the planting arm assembly using contact arm biasing springs 113 at each side. The contact arm biasing springs are connected at upper ends to the first planting assembly piece using mounting bracket 114. The lower ends of the contact arm biasing springs are connected to the contact arms using any suitable arrangement, such as lower spring mounting bracket 115 which extends to connect both contact arms together in a single assembly. The contact arm biasing springs are preferably provided at each side of the first planting assembly piece 71 to provide balanced forces. The contact arm biasing springs can further be provided with interior extension limiting rods 117 to limit the force of the contact arm assembly hanging on the springs.

As the first planting assembly piece 71 is moved downwardly the contact arm also moves downwardly until the soil level is contacted by the foot 111c. This contact with the soil acts as a soil level height indicator which is preferably used to automatically control the operation of the planting subassembly as is explained further hereinafter.

To automatically control the planting assembly based on soil level the seedling planter preferably includes a planting assembly soil height control subsystem 120. The planting assembly soil height control subsystem 120 utilizes or incorporates the soil height level information provided by the soil level detection system 110. This is advantageously done by a direct mechanical linkage or other suitable means. As shown, the contact arms 111 are pivotally connected to a soil height transfer link 121. The soil height transfer link is also pivotally connected to a height control actuation lever arm 122. The height control lever arm 122 is pivotally connected at a main lever arm pivot 123 to the first planting assembly piece 71. As the contact arm foot 111c strikes the ground the transfer link 121 is pushed upwardly causing the soil height control lever arm 122 to rotate clockwise, as shown in FIG. 2. Also compare the change in lever arm 122 between FIGS. 4 and 5. The forward end 122a of the soil height control lever arm 122 in turn moves downwardly and depresses a control 125 which prevents further downward movement of the planting assembly first piece 71 by terminating extension of the planting assembly first piece actuator 75. Control 125 also preferably activates the planting arm actuator 83 causing it to extend, thus pivoting the planting arm into the approximately vertical planting position, such as shown in FIG. 6. Further details of the planting assembly soil height control subsystem will also be described below in connection with the hydraulic and electrical systems, and the general operation of the seedling planter.

FIG. 10 shows a preferred form of hydraulic system 130 used in the seedling planter 20 of this invention. The hydraulic system includes a reservoir 131. A pump supply line 132 supplies hydraulic fluid to a high pressure hydraulic pump 133, preferably via a low pressure filter 134. The pump is preferably driven using a power take off on the tractor 18, and can be mounted on the tractor. The output from pump 133 is also preferably filtered through a high pressure filter 135. The high pressure hydraulic fluid is supplied via high pressure supply line 137. A safety pressure relief valve 138 is connected to the high pressure supply line 137 and releases hydraulic fluid back to the reservoir when pressure in that line exceeds a preset relief pressure, such as 2000 psig.

The high pressure output from the pump is supplied to a main hydraulic control valve 140. Main valve 140 is a 4-way valve which can assume 3 different flow conditions. In the first or neutral condition, illustrated in FIG. 10, the supply line 137 is connected to the reservoir return line 139. In the second or parallel operational condition the high pressure supply line 137 is in direct fluid communication with the controlled supply line 147. Line 149 is also in direct fluid communication with the fluid return line 139 when the main valve is in the second operational condition. The final operational condition is where the lines are effectively crossed with high pressure supply line 137 feeding line 149, and return line 139 connected with controlled supply line 147.

The controlled high pressure supply line 147 feeds hydraulic fluid through a planting assembly first piece actuator control valve 125 which is a hydraulic deceleration valve known in the art. Fluid normally flows through valve 125 until the valve is actuated by the soil level control system lever arm 122. When lever 122 depresses valve 125 the flow through valve 125 ceases. This causes pressure in line 147 to increase. A check valve 141 shunts around valve 125 to allow contraction of the ram 75 during the return stroke of the planting assembly.

Controlled supply line 147 also feeds hydraulic fluid to pressure trip valve 143. The pressure trip or sequence valve does not pass fluid until the pressure in line 147 exceeds a preset trip value. The pressure conditions for activating the sequence valve into a conductive condition only occur when the deceleration valve 125 has been closed as a result of activation by lever arm 122. Thus fluid is passed via line 145 to hydraulic ram 83 which acts as the planting arm actuator. The planting arm hydraulic ram 83 extends only after the first planting assembly piece 71 has been lowered to the desired height position relative to the soil as indicated by FIG. 5. The high pressure fluid extends the planting arm actuator 83 and causes the planting arm to move into the extended planting position shown in FIG. 6.

The line 145 is also connected to another pressure relief valve 146 which returns fluid to the reservoir 131 when the ram 83 becomes fully extended. The opposite side of ram 83 is exhausted through check valve 150 back to the reservoir via return lines 149 and 139.

After the planting arm has been fully extended the main control valve 140 is automatically changed to the neutral position as the seedling is released. Thereafter control valve 140 is change to the third operational condition in which the high pressure supply line 137 is placed into fluid communication with line 149. In this condition the high pressure hydraulic fluid is supplied to the contraction end of the planting assembly first link actuation ram 75, thereby causing that piece to begin retracting, as indicated in FIG. 7. The reversed flow of pressurized hydraulic fluid through line 149 also passes to a sequence or pressure trip valve 151 which communicates pressurized fluid therethrough to line 153 when the ram 75 has been retracted and the pressure in line 149 increase above the preset trip pressure of sequence valve 151. The fluid supplied via line 153 then pressurizes the contraction end of the planting arm actuator 83.

This causes the planting arm 80 to retract as indicated in FIG. 8. Simultaneous with and shortly after the retraction of the planting assembly, the pressurized fluid in line 153 also causes the support wheel carriage actuation ram 63 to move into an extended position which lifts weight otherwise carried by the packing wheels 41 during the time of planting to improve packing about the seedling. After the planting assembly has been fully retracted and the support wheels extended, the main control valve 140 is moved into the first or neutral operational condition as controlled by the electrical system, as described below.

FIG. 11 shows an electrical schematic diagram of a preferred electrical system 160 used to control the seedling planter 20 as described above. Positive voltage supply is indicated by the triangular lined symbol with the apex connected to the line. The negative voltage supply is indicated by the triangular lined symbol with the large side or base of the triangle connected to the line. The electrical system includes an operator initiated cycle start switch 161. The cycle start switch can alternatively be initiated by an odometer or other suitable automatic control, in which case the cycle start switch would typically be solenoid actuated or the equivalent. Use of an odometer cycle start initiation control allows seedlings to be placed at fixed increments along the field. The odometer (not illustrated) can sense distance using the planter support wheels 55 as the ground tracking element.

The electrical control system also advantageously includes two programmable relay units 163 and 164. The preferred programmable relays include internal clocks to allow preset sequence delays to be programmed into the control system. Both programmable relays are connected to both the positive and negative voltage supplies, typically provided as a DC battery from the driving tractor 18. The positive voltage is connected to terminals 163a and 164a, respectively. The negative supply is connected to the terminals 163b and 164b, respectively. Both programmable relays 163 and 164 have double pole double throw solenoid actuated switches 163e and 164e, respectively, incorporated thereinto. The solenoid operated double pole double throw switch 163e is normally in a first position, in which the first pole terminal 163h is electrically connected to the terminal 163g. Also in the first position the second pole terminal 163i is electrically connected to the terminal 163j. Terminals 163f and 163k are not conductive through the relay when the solenoid operated switch 163e is in the first position. A similar relationship exits in relay 164 with respect to terminals 164f-k, which are designated with similar reference letter suffixes.

A completed circuit between terminals 163c and 163d on relay unit 163, and between terminals 164c and 164d on relay unit 164 cause the double pole double throw switches 163e and 164e, respectively, to be thrown into second positions and activated. For relay 163 the second position places first pole 163h in electrical connection with terminal 163f, and second pole 163i in electrical connection with terminal 163k. Terminal 163k is not connected to any other feature of the control circuitry. A similar change occurs when the second relay 164 is activated by closing of the planting arm limit switch 167. The planting arm limit switch closes by mechanical action of the planting arm assembly which occurs when the planting arm 80 is extended downwardly into the planting position shown in FIG. 6. The planting arm limit switch 167 is advantageously mounted upon the planting arm actuator, such as at ram 83.

The first relay terminal 163d is electrically connected to the second relay terminal 164j. When the second relay is in the first or normal throw position the terminal 164j is connected to terminal 164i. Terminal 164i is connected to the operator activated cycle start switch 161. Thus when the operator or other automatic means closes switch 161 the terminals 163c and 163d are connected together and the solenoid operated double pole double throw switch 163e is placed into the second or activated position. In that position the down activation terminal 140a of the down operational solenoid 140e of main control valve 140 is supplied with positive current. Such positive current is supplied through terminals 164h to terminal 164g and on through terminal 163f to terminal 163h and down to valve solenoid terminal 140a. The main control valve down solenoid 140e also is connected from terminal 140b to ground. This action thus causes the main control valve 140 to go into the down mode associated with the second or parallel operational condition explained hereinabove. This in turn leads to the sequence of events moving the planting assembly first piece down, followed by automatic limiting of the downward motion of that piece. The planting arm is then automatically extended with the planting arm pivot axis automatically controlled to be a desired height above the soil. The planting arm quickly rotates and is forced into the soil and the seedling is released.

When the planting arm is fully extended the planting arm limit switch 167 is closed. This causes the solenoid operated double pole double throw switch 164e of the second relay 164 to assume the second or activated position. This in turn causes the circuit through terminals 164g and 164h to be terminated thus moving the valve 140 into the neutral position. This maintains the planting arm extended to allow release of the seedling by the mechanical release of the jaws 91 and 92 as explained hereinabove. This change causes the first relay switch 163e to go back to the first or normal position, but only after a preprogrammed delay as indicated on the timing diagram of FIG. 9, as explained further below. The change in the second relay 164 into the activated position connects positive current through terminals 164h to terminal 164f. Terminal 164f is connected to terminal 163j on the first relay. Terminal 163j is not initially connected to terminal 163; because the first relay 163 is still in an active condition because of the time delay. When the time delay runs on the first relay 163, then terminal 163j becomes connected to terminal 163i which causes positive current to be communicated to the up activation terminal 140c of the solenoid 140f which operates main hydraulic control valve 140 into the crossed or third operational state. The terminal 140d of solenoid 140f is connected to ground to allow operation of the up solenoid 140f. The solenoids 140e and 140f can either be included in or operatively connected to the main hydraulic control valve 140.

The activation of the up solenoid of the main hydraulic valve causes the hydraulic valve to assume the crossed operational condition which causes the hydraulic system to return the planting assembly first piece 71 upwardly followed by retraction of the planting arm 80. The support wheel carriage assembly 50 is also extended to remove or reduce forces applied to the ground by the packing wheels 41.

After the planting arm 80 has been partially retracted, the planting arm limit switch is returned to an open condition and the second relay 164 is thereby placed in condition to be returned to the normal or first throw position. However, the clock in the second programmable relay is set for a suitable delay time, to allow complete return of the planting assembly and extension of the support wheels prior to this change in the relay switch 164e. Thereafter the second relay returns the electrical control system to a ready state in which it awaits closing of the operator activated cycle start switch 161 prior to performing another cycle.

FIG. 9 further shows information which is descriptive of the operation of the seedling planter 20. The time line of FIG. 9 first shows a load position which can be of variable length. FIG. 4 shows the seedling planter in the loading position. After the operator has manually or otherwise loaded a seedling into the seedling holder on the planting arm, the cycle initiation switch 161 is depressed into a closed position, as indicated at the bottom line of the timing diagram of FIG. 9. This activates the first programmable relay 163 which remains activated for a preprogrammed period, such as the approximately 1.2 seconds shown. The activation of the first relay causes the down solenoid 140e to be activated and place the main hydraulic control valve 140 into the parallel or second operational state. This operational state is maintained for about 0.8 seconds until the planting arm limit switch 167 is closed and the second relay is activated which causes the down solenoid to be deactivated and the main control valve 140 to go into a neutral condition. The deceleration valve 125 is closed as the soil height sensing subsystem contact arm strikes the ground, about 0.4 seconds after the initial operator activation. The initial contact of the contact arm 111 with the soil is illustrated in FIG. 5. This in turn causes the planting arm actuator 83 to be pressurized to rotate the planting arm into the planting position of FIG. 6. In the planting position the seedling holder lever arm 95 bears against the lever arm actuator 102 thereby opening the jaws 91 and 92 releasing the seedling into the soil. The extension of the planting arm closes the planting arm limit switch 167 thus activating the second relay 164. The second relay is preprogrammed to remain active for approximately 1.4 seconds.

The activation of the second relay 164 causes the main hydraulic 4-way valve 140 to return into the neutral or first operational condition. This holds the planting arm in the extended position for approximately 0.4 seconds until the first relay 163 is deactivated by its internal programmed clock mechanism. When the first relay is deactivated the up solenoid is activated and the main hydraulic valve is changed to the third or cross operational state. This in turn causes the planting assembly first piece or A-frame 71 to begin to retract. After the A-frame has retracted the sequence valve 151 passes hydraulic fluid and the planting arm 80 is retracted. When the planting arm is retracted the limit switch 167 is opened. The support wheel carriage assembly 50 extends to relieve weight from the packing wheels. The up solenoid remains active until the second relay 164 is deactivated by its internal clock. Upon deactivation of the second relay 164, the support wheel extension ram 63 is depressurized and support wheels are retracted upwardly to again increase force on the packing wheels in preparation for the next seedling planting. The seedling planter is thus returned to the loading position awaiting installation of another seedling into the seedling holder and cycle initiation by closing switch 161.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

I claim:

1. A seedling planter for planting seedling into soil, comprising:
    a frame;
    a planting arm mounted to the frame for motion into and away from the soil;
    a planting arm actuator for moving the planting arm into and away from the soil;
    a seedling holder for holding a seedling in position on the planting arm for insertion and release of the seedling into soil;
    packing means for packing soil about seedlings released into the soil from the planting arm;
    at least one frame support wheel adjustably mounted to the frame rearward of and in approximate longitudinal alignment with the packing means for adjustably supporting the frame upon the soil to thereby vary the force applied to the ground through said packing means.

2. A seedling planter according to claim 1 wherein said at least one frame support wheel is connected to the frame using a support wheel carriage which is pivotally connected to the frame.

3. A seedling planter according to claim 1 wherein said at least one frame support wheel is connected to the frame using a support wheel carriage which is pivotally connected to the frame; and further comprising
    actuator means operably connected between the support wheel carriage and the frame for pivotally moving the support wheel carriage relative to the frame.

4. A seedling planter according to claim 1 and further comprising a support wheel return spring.

5. A seedling planter according to claim 1 and further comprising a height control subsystem for sensing and controlling the depth to which said planting arm is moved into the soil.

6. A seedling planter according to claim 1 and further comprising a first planting assembly link movably connected to the frame; said planting arm being connected to the frame by said first planting assembly link.

7. A seedling planter according to claim 1 and further comprising:
    a first planting assembly link movably connected to the frame; said planting arm being connected to the frame by said first planting assembly link.
    a soil level height detector for detecting the height of the first planting assembly link relative to the soil.

8. A seedling planter according to claim 7 wherein said soil level height detector is connected to said first planting assembly link to move upwardly and downwardly therewith and provide intermittent contact sensing of soil level.

9. A seedling planter according to claim 1 and further comprising a soil level height detector for detecting the height of said planting arm relative to the soil.

* * * * *